United States Patent [19]

Matsuki et al.

[11] Patent Number: 4,863,167
[45] Date of Patent: Sep. 5, 1989

[54] MULTI-PIECE SOLID GOLF BALL

[75] Inventors: Taketo Matsuki, Nishinomiya; Akihiro Nakahara, Ibaraki, both of Japan

[73] Assignee: Sumitomo Rubber Industries, Ltd., Hyogo, Japan

[21] Appl. No.: 159,427

[22] Filed: Feb. 17, 1988

Related U.S. Application Data

[63] Continuation of Ser. No. 792,773, Oct. 30, 1985, abandoned.

[30] Foreign Application Priority Data

Oct. 30, 1984 [JP] Japan .................................. 59-229300

[51] Int. Cl.⁴ ............................................... A63B 37/00
[52] U.S. Cl. ................................... 273/62; 273/220; 273/230
[58] Field of Search ............... 273/220, 218, 219, 221, 273/218, 235, 62, 227, 228

[56] References Cited

U.S. PATENT DOCUMENTS

| | | | |
|---|---|---|---|
| 1,470,302 | 10/1923 | Thomas | 273/225 |
| 1,568,514 | 1/1926 | Lewis | 273/225 |
| 2,741,480 | 4/1956 | Smith | 273/230 X |
| 4,625,964 | 12/1986 | Yamada | 273/220 |

FOREIGN PATENT DOCUMENTS

| | | | |
|---|---|---|---|
| 763821 | 7/1967 | Canada | 273/225 |
| 3428 | of 1876 | United Kingdom | 273/218 |
| 18233 | of 1895 | United Kingdom | 273/220 |
| 2807 | of 1899 | United Kingdom | 273/220 |
| 1095615 | 12/1967 | United Kingdom | 273/220 |

Primary Examiner—George J. Marlo
Attorney, Agent, or Firm—Birch, Stewart, Kolasch & Birch

[57] ABSTRACT

A three piece solid golf ball having improved rebound characteristics and a higher initial velocity which includes a center portion, an outer layer disposed over the center portion, and a cover disposed over the outer layer. The outer layer is formed from a rubber composition containing a base rubber, and has a base rubber volume content ratio of at least 0.65. The rubber composition of the outer layer further contains a gravity filler with a high specific gravity such that the outer layer has a higher specific gravity than the center, wherein the difference in specific gravity between the outer layer and the center varies from 0.15 to 0.8 for a small size golf ball and from 0.15 to 0.45 for a large size golf ball. The gravity filler may be selected from tungsten, tungsten carbide, molybdenum, lead, lead dioxide, nickel, or copper.

16 Claims, 1 Drawing Sheet

MULTI-PIECE SOLID GOLF BALL

This application is a continuation of application Ser. No. 792,773 filed on Oct. 30, 1985, now abandoned.

FIELD OF THE INVENTION

The present invention relates to an improved multi-piece solid golf ball.

BACKGROUND OF THE INVENTION

There are many important properties in a golf ball, one of which is its flight distance. The flight distance of a golf ball is governed by various factors such as initial velocity, number of revolutions, angle of departure, moment of inertia, dimple form and the like. Among them, the most important factor is initial velocity which is particularly governed by the rebound characteristics. Therefore the rebound characteristics are very important.

There have been two types of golf balls known in the prior art. One is a wound golf ball and the other is a solid golf ball. The solid golf ball is very popular because of its cheap production cost and durability, in comparison with the conventional wound golf ball. The solid golf ball has been improved with respect to materials to be formulated and its construction to provide various types of solid golf balls having excellent properties since the golf ball was proposed by J. S. Bartsh. However, satisfactory rebound characteristics still have not been imparted to such solid golf balls.

The conventional solid golf balls are classified by their construction into one-piece solid golf balls having a unitary layer and two-piece solid golf balls produced by covering a solid core with a cover. Besides these, a multi-piece solid golf ball, in which the solid core of the above two-piece solid golf ball is plural-layered, has recently been proposed (see Japanese Patent Publication (unexamined) No. 49840/1976, Application No. 122898/1974). The solid golf ball disclosed in this publication has more weight in an inner layer than in an outer layer, which is the same construction as the conventional wound golf ball.

For improving the multi-piece solid golf ball, the present inventors have made proposals in Japanese Utility Model Application Ser. No. 64006/1983 and Japanese Patent Publication (unexamined) No. 194760/1984, in which the weight of the plural-layered solid core becomes heavier closer to the cover. This multi-piece solid golf ball effectively improves rebound characteristics without affecting adversely its other properties.

However, in such a multi-piece solid golf ball, since a filler, such as zinc oxide, barium sulfate, silica, calcium carbonate, zinc carbonate and the like is formulated in a high amount, the rubber has to be formulated in a small amount, and thus the rebound characteristics become worse. Accordingly, the improvement of the rebound characteristics by this technique has its limitations.

SUMMARY OF THE INVENTION

An object of the present invention is to provide a multi-piece solid golf ball produced by covering a solid core consisting of at least two layers with a cover, in which the outer layer of the solid core contains a filler having a high specific gravity.

The present invention will become more fully understood from the detailed description given hereinbelow and the accompanying drawing which is given by way of illustration only, and thus is not limitative of the present invention and wherein:

FIG. 1 shows a three-piece said golf ball having a partial cross section, which is one type of the multi-piece solid golf ball of the present invention.

DETAILED DESCRIPTION OF THE PRESENT INVENTION

Figure 1:
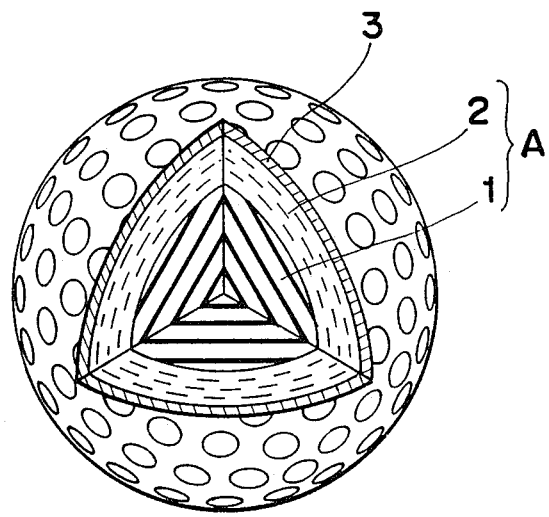

For making explanation simple, the present invention is illustrated using a three-piece solid golf ball produced by covering a solid core A having a center 1 and outer layer 2, with a cover 3 as illustrated in FIG. 1.

The solid core A of the multi-piece solid golf ball of the present invention comprises a base rubber, a cross-linking agent, a co-crosslinking agent, a filler and the like.

The base rubber includes natural rubbers and/or synthetic rubbers, which are conventionally used for solid golf balls. Preferred is 1,4-polybutadiene having a cis-structure of at least 40%. Natural rubber, polyisoprene rubber, styrene-butadiene rubber may be optionally added to 1,4-polybutadiene.

The crosslinking agent includes an organic peroxide, such as dicumyl peroxide, t-butyl peroxide and the like, and an zao compound, such as azobisisobutyronitrile and the like. Preferred is dicumyl peroxide.

The amount of the crosslinking agent is generally 0.5 to 3.0 parts by weight, preferably 1.0 to 2.5 parts by weight based on 100 parts by weight of the base rubber.

The co-crosslinking agent of the present invention includes a metal salt of unsaturated fatty acid, for example a zinc salt or magnesium salt of unsaturated fatty acid having 3 to 8 carbon atoms, such as acrylic acid or methacrylic acid and the like. Preferred is zinc acrylate. The amount of the co-crosslinking agent is 30 to 40 parts by weight based on 100 parts by weight of the base rubber.

The filler includes zinc oxide, barium sulfate, silica, calcium carbonate, zinc carbonate and the like. Preferred is zinc oxide.

The filler having a high specific gravity is one which is not used for a rubber composition of golf ball. Examples of the fillers are tungsten, tungsten carbide, molybdenum, lead dioxide, nickel, copper and the like. Preferred is tungsten or tungsten carbide.

The amount of the filler is not limited, because it varies depending on its weight distribution in each layer of the plural layered solid core and a weight standard of the golf ball. Generally, the amount of the filler is 3 to 150 parts by weight based on 100 parts by weight of the base rubber. Especially, the amount is 3 to 80 parts by weight based on 100 parts of the base rubber in a large size golf ball and 3 to 150 parts by weight based on 100 parts of the base rubber in a small size golf ball.

In the solid golf ball of the present invention, the amount of a rubber component of the outer layer can increase in comparison with that of the Japanese utility model application mentioned above, because the filler having a high specific gravity is formulated into the outer layer of the solid core. Accordingly, it can avoid lowering rebound characteristics.

The amount of the rubber component of the outer layer 2 is generally not less than about 0.65 by volume ratio, preferably about 0.7 to 0.9 by volume ratio.

The specific gravity of the outer layer 2 is 1.30 to 2.50, preferably 1.35 to 2.00. The specific gravity of the center of the solid core A is 1.03 to 1.25, preferably 1.05 to 1.20. The difference in the specific gravity between the outer layer and center is generally at least about 0.15 to about 0.8 (0.15 to 0.45 in a larger size golf ball and 0.15 to 0.8 in a small size golf ball). Specific gravity differences less than 0.15 are undesirable, because the rebound characteristics do not increase. Specific gravity differences of more than 0.8 are undesirable, because the making of the inner layer is impossible for the weight standard of the golf ball.

The filler having a high specific gravity can be optionally combined with a conventional filler having a relatively small specific gravity for the reason of conforming its specific gravity and vulcanization and so on.

Besides the above components, the other additives such as antioxidants and the like may be added to the rubber composition of the solid core, if desirable.

In the solid golf ball of the present invention, the weight of the solid core is made heavy on the outer layer. This weight distribution is adjusted by the load of the filler and the diameter or thickness of the layer.

The process for preparing the solid core includes (1) mixing the above components except the filler having a high specific gravity by a conventional mixer, such as a banbary mixer or a roll, to form a center composition; (2) subjecting the center composition to compression or injection molding followed by curing by heat; (3) covering the center with the composition for the outer layer by compression or injection molding followed by curing by heat. When the outer layer is plural layered, the process (3) is repeated.

The hardness of the layers constituting the core is not limited. It is preferred for the center to have 57 to 80 (Shore C) for hardness value. As is shown in Japanese Patent Publication No. 194760/1984 mentioned above, it is more preferred for the golf ball to have a higher hardness on the outer layer than the inner layer including the center and not more than 83 (Shore C), from the view point of the ball's transformation and restoring force when the ball is shot and impact is felt.

Such a hardness distribution can be generally adjusted by curing conditions, such as temperature of curing, rate of elevating temperature, period for curing and the like.

The size of each layer is not limited. Generally, a center having a diameter of 20 to 35 mm is covered with an outer layer having 2 to 10 mm.

The obtained plural layered solid core produced as illustrated above is covered by a cover. The cover comprises an ionomer resin and an inorganic filler such as titanium oxide, zinc oxide and the like.

Preferred ionomer resins are thermoplastic resins obtained by giving a cross metallic bond to polymers of monoolefin with at least one member selected from the group consisting of unsaturated mono- or di-carboxylic acids having 3 to 8 carbon atoms and esters thereof (the polymer contains 4 to 30% by weight of the unsaturated mono- or di-carboxylic acid and/or the ester thereof). As such ionomer resins, there are given for example various kinds of "Surlyn" available from Du Pont Co. (e.g. Surlyn 1601, 1707, 1605, etc. or their combination).

The method for covering the solid core with the cover is not particularly limited. Generally, the solid core is wrapped with two pieces of a cover molded in a semi-spherical shell form, and then subjected to heat-pressure molding. The solid core may be wrapped by injection-molding the cover composition around it, if desirable. The thickness of cover is 0.5 mm to 3.0 mm, preferably 1.0 mm to 2.5 mm.

The multi-piece solid golf ball of the present invention has excellent rebound characteristics and therefore has excellent initial velocity which is a significant factor in flight distance, in comparison with conventional wound golf balls, two-piece solid golf balls and the like.

Further scope of the applicability of the present invention will become apparent from the specific examples given hereinafter. However, it should be understood that these specific examples, while indicating preferred embodiments of the invention, are given by way of illustration only, since various changes and modifications within the spirit and scope of the invention will become apparent to those skilled in the art.

EXAMPLES 1 AND 2

A center having a 28.0 mm diameter was prepared using the center composition described in Table 1 by mixing the center composition by rolling and curing in a cavity at 150° C.

The obtained center was covered with an outer layer composition described in Table 1 by injection molding to cure by heat to form a two-piece solid core.

The resultant two-piece solid core is further covered by a semi-spherical cover prepared by the composition described in Table 1 in about 2 mm thickness and heat-pressure molded to form a three-piece solid golf ball.

The physical properties are shown in Table 1.

COMPARATIVE EXAMPLE 1

A three-piece solid golf ball was obtained by the composition indicated by Comparative Example 1 as generally described in Example 1. The physical properties are shown in Table 1.

TABLE 1

|  |  |  | Example | | Comparative Example | |
|---|---|---|---|---|---|---|
|  |  |  | 1 | 2 | 1 | 2 |
| Solid Core | Center composition (parts by weight) | Cis 1,4-polybutadiene[1] | 100 | | | |
|  |  | Zinc acrylate | 36 | | | |
|  |  | Zinc methacrylate | 3.4 | | | |
|  |  | Zinc oxide | 4.5 | | | 50.1 |
|  |  | Dicmylperoxide | 1.0 | | | 1.2 |
|  |  | Antioxidant | 1.0 | | | 1.2 |
|  | Outer layer composition (parts by weight) | Cis 1,4-polybutadiene[1] | 100 | | | |
|  |  | Zinc acrylate | 36 | | | |
|  |  | Zinc methacrylate | 3.4 | | | |
|  |  | Zinx oxide | 10 | | 83.0 | |
|  |  | Tungsten | 57.9 | — | | |
|  |  | Tungsten carbide | — | 59.0 | — | |
|  |  | Dicmylperoxide | 1.0 | | | |

TABLE 1-continued

|  |  |  | Example 1 | Example 2 | Comparative Example 1 | Comparative Example 2 |
|---|---|---|---|---|---|---|
| Cover | composition (parts by weight) | Antioxidant | | 1.4 | | |
| | | Ionomer resin[2] | | 100 | | |
| | | Titanium oxide | | 3 | | |
| | Thickness (mm) | | | 2.15 | | |
| | Hardness (Shore D) | | | 68 | | |
| Physical property of solid core | Diameter (mm) | Center | | 28.0 | | |
| | | Outer layer | | 37.0 | | 37.0 |
| | Specific gravity | Center | | 1.084 | | |
| | | Outer layer | | 1.508 | | 1.340 |
| | Volume rate of rubber component | Outer layer | 0.774 | 0.770 | 0.772 | |
| | | Center | 0.798 | 0.798 | 0.798 | 0.752 |
| | Weight (g) | | | 35.5 | | 35.6 |
| | Compression[5] | | | 48.8 | 48.9 | 48.7 |
| | Rebound coefficient[6] | | +0.027 | +0.023 | +0.013 | ±0.000 |
| Physical property of ball | Flight Distance (m) | Shot by Driver[3] Carry | 208 | 207 | 205 | 201 |
| | | Total | 240.0 | 238.5 | 236.7 | 232.3 |
| | | Shot by #5 iron[4] Carry | 173.1 | 172.2 | 170.2 | 167.9 |
| | | Total | 187.5 | 186.2 | 184.0 | 182.2 |
| | Rebound coefficient[7] | | +0.03 | +0.025 | +0.02 | ±0.0000 |

COMPARATIVE EXAMPLE 2

A two-piece solid golf ball was prepared by using the composition indicated by Comparative Example 2 as generally described in Example 1, with exception that the solid core was made a single layer.

(1) Available from Japan Synthetic Rubber Co., Ltd. as JSR BR01.
(2) Mixture of Surlyn 1601 and Surlyn 1707.
(3) Head speed: 45.2 m/s.
(4) Head speed: 37.2 m/s.
(5) A changed amount obtained by further applying a 43.8 kg weight to a golf ball which has been applied by a 3.8 kg weight (1/1000 inch=compression 1).
(6) A value which is calculated from the initial velocity of the solid core at the time when 198.4 g of a cylinder was collided with the solid core at 45 m/sec. It is expressed by an amount relative to the weight of the core of Comparative Example 2.
(7) Relative values which are calculated from the initial velocity of the ball at the time when 198.4 g of a cylinder was collided with the golf ball at 45 m/sec. It is expressed by an amount relative to the weight of the core of Comparative Example 2.

EXAMPLES 3, 4 AND COMPARATIVE EXAMPLES 3, 4

The test mentioned in Examples 1, 2 and Comparative Examples 3, 4 was repeated, with exception that large size golf balls were formed instead of small size golf balls. The charge of the golf balls and the result of tests are shown in Table 2.

TABLE 2

|  |  |  | Example 3 | Example 4 | Comparative Example 3 | Comparative Example 4 |
|---|---|---|---|---|---|---|
| Solid Core | Center composition (parts by weight) | Cis 1,4-polybutadiene | 100 | 100 | 100 | 100 |
| | | Zinc acrylate | 32 | 32 | 32 | 32 |
| | | Zinc oxide | 10 | 10 | 10 | 20.0 |
| | | Antioxidant | 0.8 | 0.8 | 0.8 | 0.8 |
| | | Dicmylperoxide | 2.2 | 2.2 | 2.2 | 2.3 |
| | Outer layer composition (parts by weight) | Cis 1,4-polybutadiene | 100 | 100 | 100 | |
| | | Zinc acrylate | 32 | 32 | 32 | |
| | | Zinc oxide | 10 | 10 | 58.2 | |
| | | Tungsten | 39.1 | | | |
| | | Tungsten carbide | | 39.8 | | |
| | | Antioxidant | 0.3 | 0.3 | 0.3 | |
| | | Dicmylperoxide | 2.0 | 2.0 | 2.0 | |
| Cover | composition (parts by weight) | Ionomer resin | 100 | 100 | 100 | 100 |
| | | Titanium oxide | 3 | 3 | 3 | 3 |
| | Thickness (mm) | | 2.15 | 2.15 | 2.15 | 2.15 |
| | Hardness (Shore D) | | 68 | 68 | 68 | 68 |
| Physical property of solid core | Diameter (mm) | Center | 33.0 | 33.0 | 33.0 | 38.4 |
| | | Outer layer | 38.4 | 38.4 | 38.4 | |
| | Specific gravity | Center | 1.087 | 1.087 | 1.087 | 1.1146 |
| | | Outer layer | 1.361 | 1.361 | 1.361 | |
| | Volume rate of rubber component | Center | 0.815 | 0.815 | 0.815 | 0.803 |
| | | Outer layer | 0.807 | 0.804 | 0.769 | |
| | Weight (g) | | 35.2 | 35.2 | 35.1 | 35.2 |
| | Compression | | 49.0 | 48.9 | 48.7 | 48.8 |
| | Rebound coefficient | | +0.020 | +0.017 | +0.010 | ±0.000 |
| Physical property | Flight Distance (m) | Shot by Driver Carry | 203.0 | 202.0 | 200.0 | 199.0 |
| | | Total | 221.0 | 220.2 | 219.1 | 218.0 |

TABLE 2-continued

|  | | Example | | Comparative Example | |
| --- | --- | --- | --- | --- | --- |
|  |  | 3 | 4 | 3 | 4 |
| of ball | Rebound Coefficient | +0.015 | +0.013 | +0.008 | ±0.0000 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A three piece solid golf ball having improved rebound characteristics and a higher initial velocity which comprises:
   a center portion;
   an outer layer disposed over said center portion; and
   a cover disposed over said outer layer;
   wherein said outer layer is formed from a rubber composition containing a base rubber, said outer layer having a base rubber volume content ratio of at least 0.65, and
   wherein said rubber composition of said outer layer further contains a gravity filler with a high specific gravity such that said outer layer has a higher specific gravity than said center, the difference in specific gravity between said outer layer and said center varying from 0.15 to 0.8 for a small size golf ball and from 0.15 to 0.45 for a large size golf ball.

2. The three piece solid golf ball of claim 1, wherein the gravity filler having a high specific gravity is at least one member selected from the group consisting of tungsten, tungsten carbide, molybdenum, lead, lead dioxide, nickel, and copper.

3. The three piece solid golf ball of claim 2, wherein the outer layer and the center are formed from a rubber composition, said rubber composition containing a base rubber, a crosslinking agent, a co-crosslinking agent, and a composition filler.

4. The three piece solid golf ball of claim 3, wherein the base rubber is selected from the group consisting of natural rubber, synthetic rubber, and 1,4-polybutadiene;
   wherein the crosslinking agent is selected from the group consisting of organic peroxides, dicumyl peroxide, t-butyl peroxide, azo compounds, and azobisisobutyronitrile;
   wherein the co-crosslinking agent is a metal salt of an unsaturated fatty acid selected from the group consisting of zinc acrylate, zinc methacrylate, magnesium acrylate, magnesium methacrylate; and
   wherein the composition filler is selected from the group consisting of zinc oxide, barium sulfate, silica, calcium carbonate, and zinc carbonate.

5. The three piece solid golf ball of claim 2, wherein the amount of crosslinking agent is from 0.5 to 3.0 parts by weight and amount of co-crosslinking agent is from 30 to 40 parts by weight based on 100 parts by weight of the base rubber.

6. The three piece solid golf ball of claim 2, wherein the base rubber volume content is from 0.7 to 0.9 and wherein the amount of gravity filler in a small size golf ball is from 3 to 150 parts by weight and in a large size golf ball is from 3 to 80 parts by weight based on 100 parts by weight of the base rubber.

7. The three piece solid golf ball of claim 1, wherein the outer layer and the center are formed from a rubber composition, said rubber composition containing a base rubber, a crosslinking agent, a co-crosslinking agent, and a composition filler.

8. The three piece solid golf ball of claim 7, wherein the base rubber is selected from the group consisting of natural rubber, synthetic rubber, and 1,4-polybutadiene;
   wherein the crosslinking agent is selected from the group consisting of organic peroxides, dicumyl peroxide, t-butyl peroxide, azo compounds, and azobisisobutyronitrile;
   wherein the co-crosslinking agent is a metal salt of an unsaturated fatty acid selected from the group consisting of zinc acrylate, zinc methacrylate, magnesium acrylate, magnesium methacrylate; and
   wherein the composition filler is selected from the group consisting of zinc oxide, barium sulfate, silica, calcium carbonate, and zinc carbonate.

9. The three piece solid golf ball of claim 7, wherein the amount of crosslinking agent is from 0.5 to 3.0 parts by weight and the amount of co-crosslinking agent is from 30 to 40 parts by weight based on 100 parts by weight of the base rubber.

10. The three piece solid golf ball of claim 7, wherein the base rubber volume content is from 0.7 to 0.9 and wherein the amount of gravity filler in a small size golf ball is from 3 to 150 parts by weight and in a large size golf ball is from 3 to 80 parts by weight based on 100 parts by weight of the base rubber.

11. The three piece solid golf ball of claim 7, wherein the base rubber is 1,4-polybutadiene with a cis-structure of at least 40% and wherein the gravity filler is selected from the group consisting of tungsten and tungsten carbide.

12. The three piece solid golf ball of claim 11, wherein the crosslinking agent is dicumyl peroxide, wherein the co-crosslinking agent is zinc acrylate, and wherein the composition filler is zinc oxide.

13. The three piece solid golf ball of claim 12, wherein the outer layer and the center additionally contain an antioxidant.

14. The three piece solid golf ball of claim 13, wherein the cover comprises an ionomer resin and an inorganic filler selected from the group consisting of titanium oxide and zinc oxide.

15. The three piece solid golf ball of claim 14, wherein the diameter of the center portion is from 20 to 35 mm, wherein the thickness of the outer layer is from 2 to 10 mm, and wherein the thickness of the cover is from 0.5 to 3.0 mm.

16. The three piece solid golf ball of claim 14, wherein the thickness of the cover is from 1.0 mm to 2.5 mm and whereby said golf ball exhibits improved rebound characteristics and flight distance characteristics.

* * * * *